United States Patent [19]

Komatsu et al.

[11] 4,426,551

[45] Jan. 17, 1984

[54] SPEECH RECOGNITION METHOD AND DEVICE

[75] Inventors: Akio Komatsu, Hachiouji; Akira Ichikawa, Musashino; Nobuo Hataoka, Hachiouji; Yoshiaki Kitazume, Sayama; Kazuhiro Umemura, Yokohama, all of Japan

[73] Assignee: Hitachi, Ltd., Tokyo, Japan

[21] Appl. No.: 208,251

[22] Filed: Nov. 19, 1980

[30] Foreign Application Priority Data

Nov. 19, 1979 [JP] Japan .................................. 54-148904

[51] Int. Cl.³ .............................................. G10L 1/00
[52] U.S. Cl. ......................................... 381/41; 381/34
[58] Field of Search .......... 179/1 SD, 1 SC, 15.55 R, 179/15.55 T; 364/513, 514

[56] References Cited

U.S. PATENT DOCUMENTS 4,060,694 11/1977 Suzuki et al. ..................... 179/1 SD
4,292,470 9/1979 An ................................. 179/15.55 R Primary Examiner—Emanuel S. Kemeny
Attorney, Agent, or Firm—Antonelli, Terry & Wands

[57] ABSTRACT

Speech sound recognition is made using a reduced number of speech parameter elements, e.g., five correlation coefficients rather than sixteen spectral coefficients. The five correlation coefficients are derived from comparison of the spectral coefficients of unknown or standard sounds against the spectral coefficients of five highly-separable vowel-like sounds. Then, unknown-sound correlation coefficients are compared with standard-sound coefficients for recognition.

7 Claims, 5 Drawing Figures

FIG. 5 is a block diagram showing an example of the normalizing circuit, the pattern buffer memory and the distance calculating circuit, each shown in FIG. 2.

SPEECH RECOGNITION METHOD AND DEVICE

BACKGROUND OF THE INVENTION

This invention relates to a method of recognizing speech and to a device therefor.

Broadly speaking, a speech recognition device can be divided structurally into (1) a calculating unit for calculating characteristic parameters of the speech and (2) a decision unit for matching the characteristic parameters with standard parameters and for recognizing the speech on the basis thereof. As the characteristic parameters of the speech, there have been employed a linear prediction coefficient, a partial auto-correlation coefficient or a filter bank output. When any of these parameters are used, the speech pattern is generally expressed as a time series of parameters of several orders. When an 8-order autocorrelation coefficient, which is sampled every 10 milliseconds, is to be considered, for example, 800 parameters are necessary to express a speech of one second duration so that there is a great increase in processing required for comparative operation with parameters of the standard patterns necessary for recognition. In addition, a large capacity memory is needed to store the standard patterns. Accordingly, it is necessary to obtain effective characteristic parameters capable of representing the speech patterns with as high a level of fidelity as possible.

SUMMARY OF THE INVENTION

It is an object of the present invention to provide a speech recognition device and a method capable of efficiently compressing parameters of input speech patterns and standard patterns, markedly reducing the processing time required for the matching operation of and also reducing remarkably the memory capacity for the standard patterns.

The characterizing features of the present invention for accomplishing the above-described objects reside in obtaining P characteristic parameters from an input speech pattern, and comparing these parameters with P characteristic parameters of n specific speech patterns, respectively, to determine the distance or correlation between them, and the n distance values thus obtained are employed as the renewed characteristic parameters of the input speech patterns and are compared with characteristic parameters of standard patterns determined in a like manner, thereby effecting the speech recognition. In this case P and n are positive integers with P being greater than n.

As the abovementioned n specific speech pattern values, characteristic parameters of those vowels which can be distinguished clearly from one another and have high separability are employed, for example.

DETAILED DESCRIPTION OF THE PREFERRED EMBODIMENTS

Figure 1:
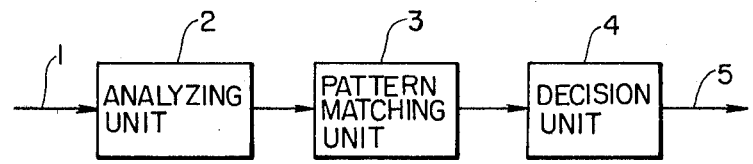
FIG. 1 is a diagram showing the fundamental construction of the speech recognition device in accordance with the present invention.

FIG. 1 shows the fundamental construction of the speech recognition device in accordance with the present invention wherein reference numeral 1 represents an input for the speech signal; 2 is an analyzing unit; 3 is a pattern matching unit; 4 is a decision unit; and 5 is an output of the recognition result.

In such a construction, the analyzing unit 2 calculates p characteristic parameters of the input speech signal 1, compares the characteristic parameters thus calculated with p characteristic parameters of n specific speech patterns, respectively, and determines the renewed characteristic parameters that represent the distance or correlation between both sets of parameters. The characteristic parameters thus determined are then compared similarly with characteristic parameters of the standard pattern, that are similarly determined by the comparison with characteristic parameters of specific speech patterns, in the matching unit 3, and the decision unit 4 recognizes the input speech and yields the result of recognition as the output 5.

Figure 2:
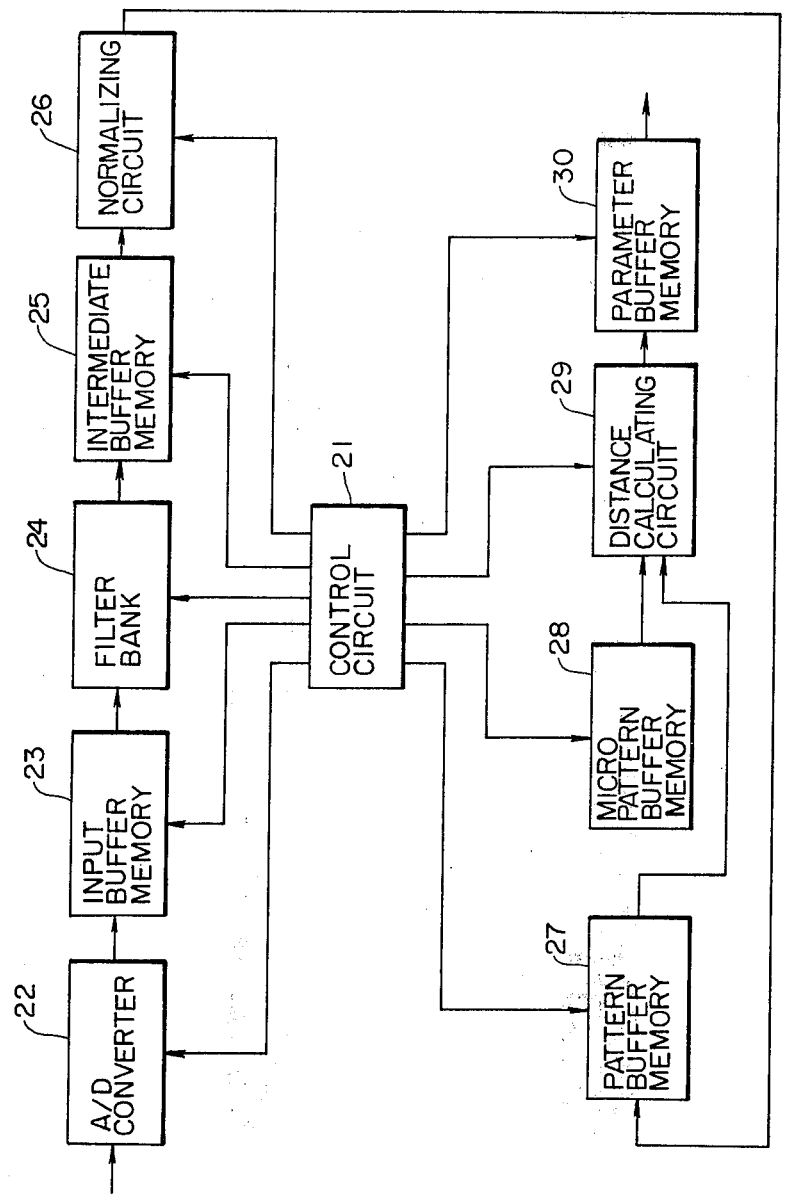
FIG. 2 is a block diagram showing an example of the principal portions of the speech recognition device in accordance with the present invention.

FIG. 2 is a block diagram showing an example of the construction of the principal portions of the speech recognition device in accordance with the present invention, the principal portions corresponding to the analyzing unit 2 of FIG. 1.

In FIG. 2, reference numeral 21 represents a control circuit consisting of sequencers or the like that generate various kinds of control signals. Reference numeral 22 represents an A/D converter; 23 is an input buffer memory; 24 is a filter bank; 25 is an intermediate buffer memory; 26 is a normalizing circuit; 27 is a pattern buffer memory; 28 is a micro-pattern buffer memory; 29 is a distance calculating circuit; and 30 is a parameter buffer memory.

This embodiment is so constructed as to make use of the output of the filter bank as the characteristic parameters representing the input speech signal.

Figure 3:
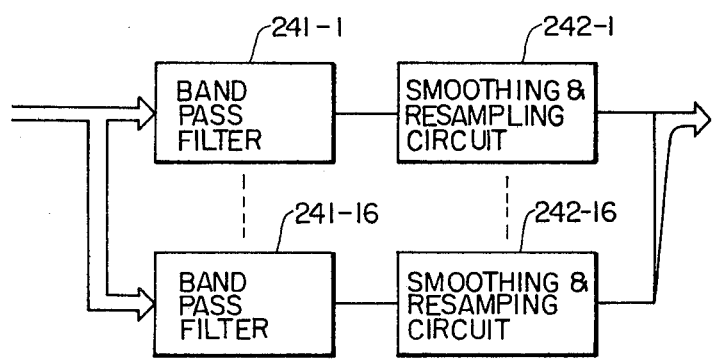
FIG. 3 is a block diagram showing a definite example of the construction of the filter bank shown in FIG. 2.

The input speech signal 1 applied to the analyzing unit 2 is converted into digital signals by the A/D converter 22 and is applied to the input buffer memory 23 while it is controlled by the control circuit 21. The digital signals applied to the input buffer memory 23 are likewise subjected to the control of the control circuit 21 and are applied to the filter bank 24. As shown in FIG. 3, this filter bank 24 consists, for example, of band pass filters 241-1 through 241-16 dividing logarithmically the frequency range in the telephone system i.e., 300–3,600 HZ, into 16 equidistant channels, and of smoothing-and-resample circuits 242-1 through 242-16 for smoothing and resampling the outputs of these band pass filters. The sixteen smoothed items of data, that are resampled at 10 second-intervals, for example, are sent to the intermediate buffer memory 25 as a vector of characteristic parameters $a_t$ of a timing t. The time series of this vector of characteristic parameters $a_t$ is sequentially arranged in the intermediate buffer memory. It is hereby assumed that $a_t = \{a_{1t}, a_{2t}, \ldots a_{16t}\}$ and $a_{jt}$ represents the output of the jth filter at the timing t. Generally, the magnitude of $a_{jt}$ varies with the input level of the input speech signal 1 and with a speaking environment so that comparison of the absolute values is difficult. Accordingly, the vector of characteristic parameters $a_t$ read out from the intermediate buffer memory 25 by the control operation of the control circuit 21 is applied to the normalizing circuit 26 to obtain a normalized vector of characteristic parameters $a'_t$. The jth element of this vector $a'_t$ is obtained in accordance with the following equation;

$$a_{ft} = Ca_{jt} / \left( \sum_{j=1}^{16} a_{jt} \right) \quad (1)$$

Here, C is a constant and is a mere coefficient. The time series of the normalized vector $a'_t$ of characteristic parameters obtained in this manner is stored in the pattern buffer memory 27 by the control operation of the control circuit 21.

Figure 4:
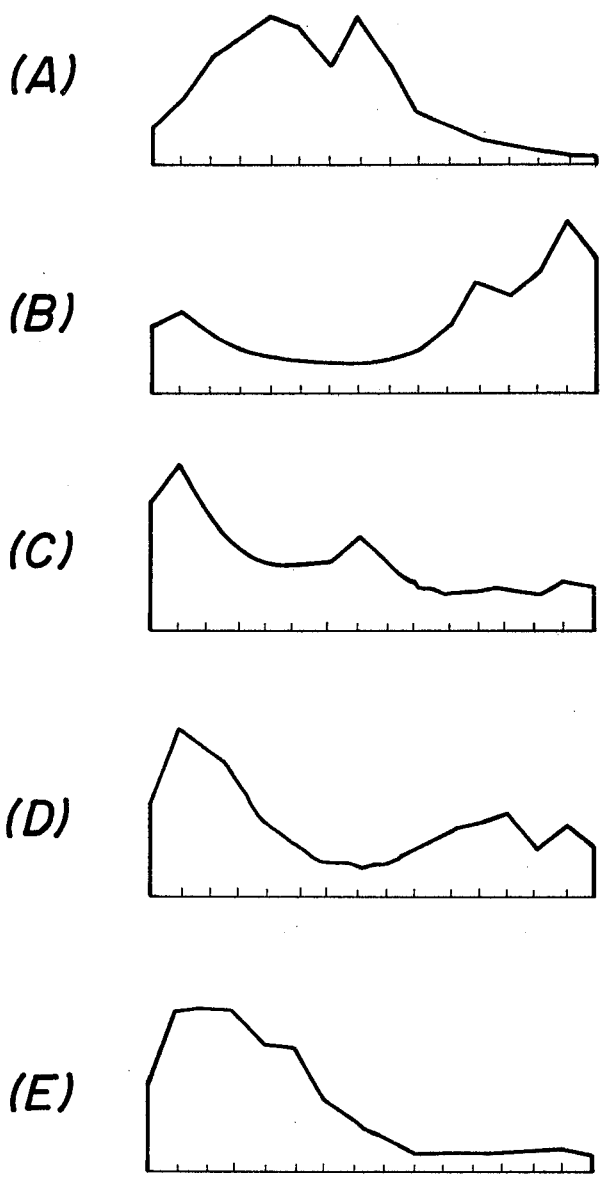
FIG. 4 is a diagram showing the characteristic parameters of vowels.

In the micro-pattern buffer memory 28 shown in FIG. 2, there is stored a vector of characteristic parameters $V_k$ ($k=1 \sim n$) of n normalized speech patterns (called "micro-patterns") such as vowels having characteristic features and obtained by the same processing as above. Here, $V_k$ need not be a time series of the vector of characteristic parameters. In other words, since the utterance of vowels, for example, are considerably stable, the vector of characteristic parameters at one timing within this stable period may be sufficiently representative. FIG. 4 shows the vectors of the normalized characteristic parameters of five vowels pronounced by an adult male. In this embodiment five micro-patterns are employed so as to correspond to the five vowels.

The distance calculating circuit 29 reads the vectors of characteristic parameters stored in the pattern buffer memory 27 and in the micro-pattern buffer memory 28 by the control operation of the control circuit 21 and calculates the distances between the vectors of the 16 normalized characteristic parameters $a'_t$ stored in the pattern buffer memory 27 and the vectors of the 16 normalized characteristic parameters $V_k$ ($k=1 \sim 5$) of the five micro-patterns, storing eventually five distance parameters $x_t^k$ ($k'=1 \sim 5$, t represents a timing) in the parameter buffer memory 30. In this instance, the distance parameter $x_t^k$ is obtained by the ordinary distance calculation as represented by the following equation;

$$x_t^k = \sum_{j=1}^{16} (a'_{jt} - V_j^k)^2, (k = 1 \sim 5)$$

Thus, the time series of the five parameters $x_t^k$ is stored in the parameter buffer memory 30. This time series of the parameters is delivered to the matching unit 3 shown in FIG. 1 and is subjected to the matching operation with the parameters of the standard pattern that is already data-compressed and registered in the same micro-pattern. Hence, the result of recognition is produced as an output from the decision unit 4 shown in FIG. 1.

In accordance with the system of the conventional speech recognition devices, the time series of the 16 parameters stored in the intermediate buffer memory 25 has been employed as the characteristic parameters to be delivered to the matching unit 3 whereas in accordance with the method of the present invention, the time series of only five parameters may be used.

Generally, the vector of characteristic parameters $a'_t$ or $V^k$ consists of the same number of bits such as 16 bits, for example, as the number of bits of the distance parameters $x_t^k$. Accordingly, in the present invention, the number of bits of the characteristic parameters required for pattern-matching in the matching unit 3 can be reduced to 5/16 as compared with the prior art and hence, the time required for the comparative operation with the characteristic parameters of the standard patterns can be shortened as much. Further, the memory capacity for storing the standard patterns can be reduced.

In the present invention, it is necessary to separately carry out the comparative operation with the characteristic parameters of the micro-patterns, but the number of the micro-patterns is about 5 at the most and is much smaller in comparison with the number of the standard patterns, e.g. 10. Hence, the comparative operation with respect to the micro-patterns can be virtually neglected. Moreover, there have been obtained such experimental data representing that even when the number of bits of the characteristic parameters for the abovementioned pattern-matching is reduced, deterioration of the recognition ratio can hardly be observed.

Figure 5:
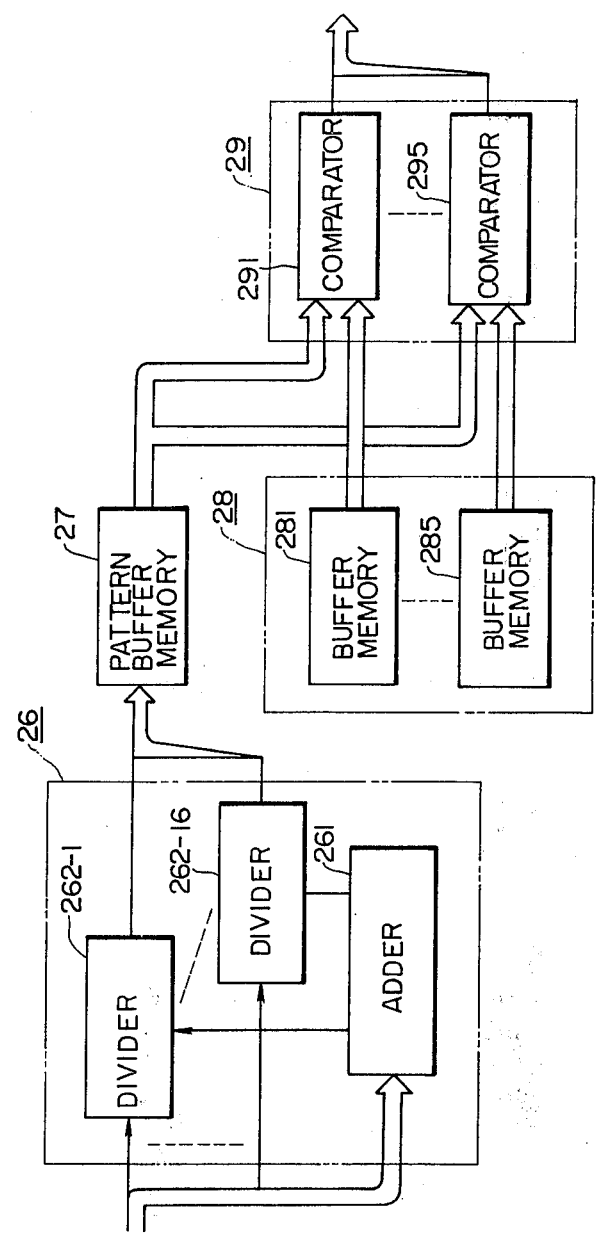

FIG. 5 is a block diagram showing an example of the definite construction of the normalizing circuit 26, the pattern buffer memories 27, 28 and the distance calculating circuit 29 of the device shown in FIG. 2.

In the normalizing circuit 26, reference numeral 261 represents a parallel input adder and reference numerals 262-1 through 262-16 represent dividers. The pattern buffer memory 28 consists of five micro-pattern memories 281 through 285, and the distance calculating circuit 29 consists also of five micro-pattern comparators 291 through 295.

In the abovementioned construction, when P characteristic parameters at a given timing are read out in parallel with one another from the intermediate buffer memory 25 and are applied to the normalizing circuit 26, these inputs are added by the adder 261 of the normalizing circuit 26, yielding $$\sum_{j=1}^{16} a_{jt}.$$

The results of addition thus obtained are applied to the dividers 262-1 through 262-16, whereby division is carried out in accordance with the aforementioned equation (1) between these inputs and the characteristic parameters $a_{jt}$ ($j=1 \sim 16$) that are applied as inputs, respectively. After the normalization, the result is stored temporarily in the pattern buffer memory 27.

Next, the P normalized characteristic parameters read out from the pattern buffer memory 27 in parallel with one another are applied to the micro-pattern comparators 291 through 295, respectively. On the other hand, since 16 characteristic parameters read out from the micro-pattern parameters 281 through 285 corresponding to these comparators are applied to the comparators 291 through 295, both input characteristic parameters are compared with one another and their distances are calculated in these comparators. Accordingly, the outputs of the micro-pattern comparators 291 through 295 become a time series of five parameters and are stored in the parameter buffer memory 30. Using the parameters thus stored in the parameter buffer memory 30, matching with the standard patterns is effected in the matching unit 3 shown in FIG. 1, and the recognition result is generated as the output from the decision unit 4.

Incidentally, it goes without noting specifically that the circuit of FIG. 5 is controlled by the control circuit 21 of FIG. 2.

Though 16 dividers 262-1 through 262-16 are shown disposed in FIG. 5, it is also possible to dispose only one divider and to normalize each characteristic parameter on the time division basis using the one divider. In addition, the micro-pattern memories 281 through 285 may be used in common with the micro-pattern comparators 291 through 295.

Furthermore, it is possible to dispose such a circuit that smoothes the time series of the five characteristic parameters obtained from the abovementioned micro-pattern comparators and resamples the parameters at every one or two intervals, so as to further compress the characteristic parameters to $\frac{1}{2}$ or $\frac{1}{3}$ in the direction of their time axes. According to the results of experiments, hardly any deterioration of the recognition ratio is observed when these compressed parameters are employed.

Still further, it is also possible to effect resampling at a point, as a representative point, where a change with time becomes maximum, after the time series of the five characteristic parameters is smoothed.

In the embodiment shown in FIG. 2, various memories 23, 25, 27, 28 and 30 are disposed separately, but these memories may be replaced by a common memory or eliminated.

Though the aforementioned embodiment employs the output of the filter bank as the parameters representing the characteristics of the speech input, recognition of the speech input may be realized by use of other parameters such as linear prediction coefficients, partial auto-correlation coefficients and the like.

Besides the characteristic parameters of the five vowels, other characteristic parameters such as frictional consonants (e.g., "S" and the like) or nasal consonants (e.g., "N", "M") may be used as the micro-patterns either alone or in combination with the vowels. Furthermore, it is possible to use those parameters which are artificially set and have intentionally stressed characteristics.

In the aforementioned embodiment, the micro-pattern operation circuit calculates the distance, but it may also calculate the likelihood. In either case, any method may be used so long as results of comparison of two patterns are shown.

Though the aforementioned embodiment uses the five micro-patterns, the object of the invention can be accomplished by use of at least one micro-pattern without being restricted particularly to the aforementioned embodiment.

As can be understood from the aforementioned embodiment, when matching is obtained between P characteristic parameters of the input speech and P characteristic parameters of n micro-patterns, respectively, the present invention can compress the magnitude of the characteristic parameters to be compared with one another in the matching units to n/P (with the proviso that n<P) as compared with the prior art, on the premise that the capacity required for storing each characteristic parameter and the capacity required for storing each distance thus obtained are virtually equal to each other. Since the processing time in the matching unit as well as in the decision unit can be shortened markedly, it becomes possible to realize high speed recognition, recognition in the real time arrangement or increase in the number of words to be recognized. The memory capacity for storing the standard patterns can also be reduced to a great extent.

As described in the foregoing, the present invention makes it possible to effectively compress the characteristic parameters of the input speech and hence, to improve the recognition speed and to increase the recognition processing quantity.

What is claimed is:

1. A method of recognizing speech comprising the following steps:
   a first step of calculating P (P: a positive integer of 2 or more) first characteristic parameters from an input speech at respective points in time;
   a second step of performing a comparative operation between said first characteristic parameters calculated at said first step and P first characteristic parameters of n (n: a positive integer of 1 or more, where P>n) specific speech patterns which have a high separability, at respective points in time to obtain n second characteristic parameters, each representing the distance or correlation between the first characteristic parameters of the input speech signal and each of the specific speech patterns; and
   a third step of detecting coincidence between said second characteristic parameters obtained at said second step and n second characteristic parameters obtained in advance by the comparison between P first characteristic parameters of a standard speech and said first characteristic parameters of said specific speech patterns, thereby effecting the recognition of the input speech.

2. The method of recognizing speeches as defined in claim 1 wherein said first step includes a step of normalizing said first characteristic parameters.

3. The method of recognizing speeches as defined in claim 1 or 2 wherein said specific speech patterns are selected from a group essentially consisting of vowels, frictional consonants and nasal consonants.

4. The method of recognizing speech as defined in claim 1, 2, or 3 wherein said second step includes a step of smoothing time series data of said second characteristic parameters and sampling said data at predetermined intervals.

5. A speech recognition device comprising:
   first means for calculating P (P: a positive integer of 2 or more) first characteristic parameters from input speech at respective points in time;
   second means for performing a comparative operation between said first characteristic parameters calculated by said first means and P first characteristic parameters of n (n: a positive integer of 1 or more, where P>n) specific speech patterns which have a high separability, at respective points in time to obtain n second characteristic parameters, each representing the distance or correlation between the first characteristic parameters of the input speech signal and each of the specific speech patterns; and
   third means for detecting coincidence between said second characteristic parameters obtained by said second means and n second characteristic parameters obtained in advance by the comparison between P first characteristic parameters of a standard speech and said first characteristic parameters of said specific speech patterns, thereby effecting the recognition of the input speech.

6. The speech recognition device as defined in claim 5 wherein said second means includes means for smoothing the time series data of said second characteristic parameters and sampling said data at predetermined intervals.

7. The speech recognition device as defined in claim 6 wherein said first means includes means for normalizing said first characteristic parameters.

* * * * *